Sept. 10, 1929.　　　S. L. STOVALL　　　1,727,733
SEPARATOR
Filed Nov. 8, 1921

Patented Sept. 10, 1929.

1,727,733

UNITED STATES PATENT OFFICE.

SMITH L. STOVALL, OF KERTO, CALIFORNIA, ASSIGNOR TO C. A. GIBSON AND J. F. GIBSON, JR., BOTH OF VISALIA, CALIFORNIA.

SEPARATOR.

Application filed November 8, 1921. Serial No. 513,663.

This invention relates to the separation of gas that is commingled with such a liquid as the crude oil discharged from an oil well. One manner in which the separation of the oil and gas may be effected is by simply flowing the oil into a large tank and conducting the gas which separates from the oil into an appropriate storage space. This is a slow and inefficient process, and in order to handle a large quantity of oil daily, very cumbersome apparatus is required. It is very desirable to provide an apparatus that will effect the separation quickly, and it is one of the objects of my invention to make it possible to effect a very speedy separation of the gas from the oil, so that comparatively small equipment may be used for this purpose.

Another object of my invention is to utilize the momentum or the kinetic energy of the mixture of liquid and gas for separating the gas from the oil.

The invention possesses other advantageous features, some of which, with the foregoing, will be set forth at length in the following description, where there will be outlined in full that form of the invention selected for illustration in the drawing accompanying and forming part of the present specification. In the drawings, I have shown one embodiment of my invention, but it is to be understood that I do not limit myself to that form since the invention as expressed in the claims may be embodied in other forms as well.

Referring to the drawings.

Figure 1:
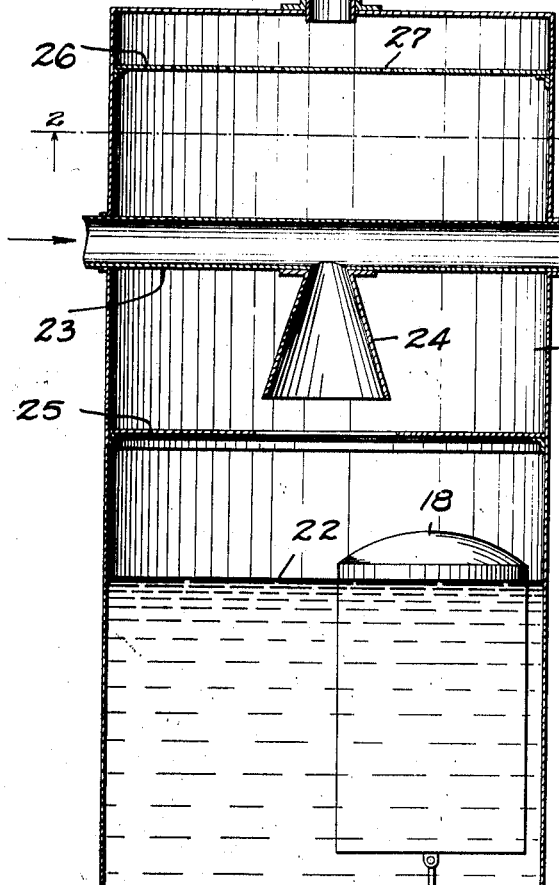
Figure 1 is a longitudinal sectional view of a complete separator.
Figure 2:
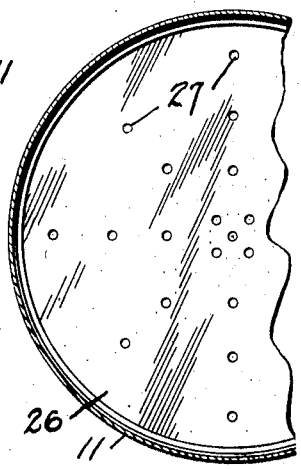
Figure 2 is a partial section along line 2—2 of Fig. 1, looking toward the top of the apparatus.

The apparatus comprises a tank or container 11 appropriately supported preferably with its axis vertical. This tank or container may conveniently be made of sheet metal in the form of a hollow cylinder. Communicating with the container at the top is a pipe 12 which is used to carry off the gas from the container 11. This pipe has an extension 13, accommodating a relief valve 14.

At the bottom of the container there is a hopper-like extension 15, which leads to a pipe 16 communicating therewith. This pipe is used to carry off the oil after the gas has been separated from it. A valve 17 is located in this pipe for keeping the level of the oil substantially constant. This valve is arranged to be operated automatically by the float 18, which has a stem 19. This stem is operatively connected to a pivoted lever 20 to which the valve stem 21 is connected. Slight variations in the height of the float within the container 11 causes a relatively large variation in the opening of the valve 17. In this way, the oil is kept at about the level 22.

The pipe 23, located above the oil level and extending transversely of the tank 11, is used to discharge the oil from the well into the container. This pipe and its associated parts are so arranged that the kinetic energy or momentum of the fast-moving oil stream serves to pass the oil through an opening into an otherwise closed receptacle. The gas, however, cannot follow the oil stream. This is due to the fact that the momentum of the moving gas is less than that of the oil, since it is comparatively light. Thus, it cannot overcome the opposition to its entry into the closed receptacle which is already filled with gas and oil. The gas is thus separated from the stream and is collected in any appropriate manner. The stream is also made expanding, to permit the gas to expand, so that it is more readily freed from the oil. For effecting this result, the pipe 23 is provided with an expansion nozzle 24, the axis of which preferably coincides with that of the tank 11. The pipe 23, however, extends entirely through to the other side of the tank where it is closed. The oil, rushing in through pipe 23, encounters an elastic column of gas which is trapped between the nozzle 24 and the closed end of pipe 23. This elastic column serves efficiently to deflect the stream of oil through the nozzle 24 without appreciable friction. Furthermore, the cutting action of the sand present in the oil is avoided. The expanding nozzle 24 also serves to decrease the temperature of the oil. Located opposite the opening of the nozzle, and above the oil level, is a plate 25 having an aperture in line with that of the nozzle 24 and just about large enough to take the stream of oil, making a closed receptacle of the lower portion of the tank 11. The liberated gas rises and finds its way to the pipe 12, while the oil drops into the bottom of the container 11. Due to the cooling effect of the expansion, the temperature of the oil in the container is reduced very rapidly to an amount safe for storing it.

Located near the top of the container 11 is a plate 26 which is used to prevent the oil from splashing into the pipe 12. It is provided with a plurality of comparatively small apertures 27 through which the escaped gas may pass into the pipe 12. The combined area of all the apertures in this plate 26 is preferably made substantially equal to that of the cross section of pipe 12.

The term "settling" chamber is the lower part of the tank 11; the "gas" chamber, the portion thereabove, and the "cleaning" chamber the upper portion of the tank above the element 24, and the inlet is represented by reference numeral 23. By these expressions, as employed in some of the claims, I do not wish to be limited to any particular form or arrangement of parts, as such terms are intended to embrace a separator having settling, gas, and cleaning chambers broadly in the combination recited in such claims.

I claim:

1. A device of the character described comprising a settling chamber having a flow inlet, a gas chamber open to said settling chamber, and a cleaning chamber above said settling chamber open at its upper portion to said flow inlet and open at its lower portion to said gas chamber.

2. A device of the character described comprising a settling chamber, a gas chamber arranged for unobstructed flow thereto from said settling chamber, and a cleaning chamber above said settling chamber and open at its discharge end to said gas chamber.

3. A device of the character described including a casing forming a settling chamber and a flow inlet pipe having an end portion extending horizontally into said casing above said settling chamber, said end portion of the pipe forming an unobstructed passage and having a closed end and a lateral opening for vertical discharge into said settling chamber.

4. The method of separating gas from oil, which consists in causing the mixture to travel rapidly in a confined stream while it is expanding, and directing the stream at an aperture in a closed receptacle, the aperture being of substantially the same size as the stream.

5. In a gas and liquid separator, a container, an inlet pipe extending across the container, one end being closed, a nozzle extending at an angle to the axis of the pipe intermediate the ends thereof, and a member having an aperture opposite the nozzle opening, the aperture being of substantially the same size as the stream of the mixture when it reaches the aperture.

6. A device of the character described, comprising a settling chamber having a flow inlet, a gas chamber open to said settling chamber, and a cleaning chamber above the settling chamber in communication with the gas chamber for cleaning the gas in its passage through the device.

In testimony whereof, I have hereunto set my hand.

SMITH L. STOVALL.